US012806823B2

(12) United States Patent
Ohata

(10) Patent No.: US 12,806,823 B2
(45) Date of Patent: Nov. 24, 2026

(54) MOLDED BODY AND METHOD FOR MANUFACTURING MOLDED BODY

(71) Applicant: Murata Manufacturing Co., Ltd., Nagaokakyo (JP)

(72) Inventor: Hiroyuki Ohata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 1 day.

(21) Appl. No.: 18/649,245

(22) Filed: Apr. 29, 2024

(65) Prior Publication Data

US 2024/0278462 A1 Aug. 22, 2024

Related U.S. Application Data

(63) Continuation of application No. PCT/JP2022/041330, filed on Nov. 7, 2022.

(30) Foreign Application Priority Data

Nov. 26, 2021 (JP) ................................ 2021-192476

(51) Int. Cl.

| | |
|---|---|
| ***B29C 33/40*** | (2006.01) |
| *B29K 101/10* | (2006.01) |
| *B29K 101/12* | (2006.01) |
| *B29K 105/00* | (2006.01) |
| *B29K 105/12* | (2006.01) |

(52) U.S. Cl.

CPC .......... *B29C 33/40* (2013.01); *B29K 2101/10* (2013.01); *B29K 2101/12* (2013.01); *B29K 2105/0079* (2013.01); *B29K 2105/12* (2013.01); *B29K 2995/0016* (2013.01)

(58) Field of Classification Search

CPC ... B05D 3/02; B05D 7/24; B05D 3/12; B05D 3/00; C08L 101/00; B29C 43/34; B29C 70/12; B29C 70/42; B29C 43/18; B29C 33/40; B29K 2105/0079; B29K 2995/0016; B29K 2101/12; B29K 2101/10; B29K 2105/12

See application file for complete search history.

(56) References Cited

U.S. PATENT DOCUMENTS 7,211,528 B2 5/2007 Katagiri et al.
8,397,378 B2 3/2013 Sohn et al.
(Continued)

FOREIGN PATENT DOCUMENTS

JP 2003-218485 A 7/2003
JP 2006-001959 A 1/2006
(Continued)

OTHER PUBLICATIONS

International Search Report for PCT Patent Application No. PCT/JP2022/041330, mailed on Jan. 10, 2023, 2 pages (English Translation Only).

*Primary Examiner* — Monica A Huson
(74) *Attorney, Agent, or Firm* — ArentFox Schiff LLP

(57) ABSTRACT

A molded body containing a liquid crystal polymer powder; and optionally containing a resin, in which the liquid crystal polymer powder contains fibrous particles including a liquid crystal polymer, an average diameter of the fibrous particles is 2 μm or less, the optional resin has heat resistance, and the optional resin is a thermoplastic resin or a thermosetting resin.

4 Claims, 4 Drawing Sheets

(56) References Cited

U.S. PATENT DOCUMENTS

| | | | |
|---|---|---|---|
| 8,450,618 | B2 | 5/2013 | Sohn et al. |
| 9,554,463 | B2 | 1/2017 | Sethumadhavan et al. |
| 11,939,507 | B2 | 3/2024 | Ohata |
| 2005/0276975 | A1 | 12/2005 | Katagiri et al. |
| 2006/0257622 | A1 | 11/2006 | Shin et al. |
| 2009/0255714 | A1 | 10/2009 | Sohn et al. |
| 2011/0315437 | A1 | 12/2011 | Sohn et al. |
| 2015/0257263 | A1 | 9/2015 | Sethumadhavan et al. |
| 2022/0204848 | A1 | 6/2022 | Ohata |

FOREIGN PATENT DOCUMENTS

| | | | | |
|---|---|---|---|---|
| JP | 2006-319324 | A | 11/2006 | |
| JP | 2007-088288 | A | 4/2007 | |
| JP | 2007-118528 | A | 5/2007 | |
| JP | 2007-169422 | A | 7/2007 | |
| JP | 2009-260228 | A | 11/2009 | |
| JP | 2012-224692 | A | 11/2012 | |
| JP | 2013-163806 | A | 8/2013 | |
| JP | 2014-102946 | A | 6/2014 | |
| JP | 2014-231533 | A | 12/2014 | |
| JP | 2017-514315 | A | 6/2017 | |
| JP | 2021-161185 | A | 10/2021 | |
| WO | WO-2004065462 | A2 * | 8/2004 | ........... B29C 43/003 |
| WO | 2021/060255 | A1 | 4/2021 | |

* cited by examiner

MOLDED BODY AND METHOD FOR MANUFACTURING MOLDED BODY

CROSS REFERENCE TO RELATED APPLICATIONS

The present application is a continuation of International application No. PCT/JP2022/041330, filed Nov. 7, 2022, which claims priority to Japanese Patent Application No. 2021-192476, filed Nov. 26, 2021, the entire contents of each of which are incorporated herein by reference.

TECHNICAL FIELD

The present invention relates to a molded body and a method for manufacturing a molded body.

BACKGROUND ART

A liquid crystal polymer (LCP) is used for a circuit board, because the liquid crystal polymer has a dielectric constant and a dielectric loss smaller than those of a polyimide resin, an epoxy resin, or the like, which is a conventional substrate material, and also has an extremely small water absorption coefficient and a small variation in dielectric characteristics due to water absorption.

Moreover, a glass bismaleimide substrate, a glass epoxy substrate, or the like containing glass fibers as reinforcing fibers in a bismaleimide resin, an epoxy resin, or the like is also used as a rigid substrate material for a circuit board. Here, when the LCP is formed into fibers, the fibers become fibers having high rigidity equivalent to glass fibers in a fiber axis direction, and thus the LCP fibers can also be used as reinforcing fibers instead of the glass fibers. The LCP has better dielectric characteristics than glass, and the finished circuit board has excellent high frequency characteristics.

In order to produce a circuit board using the LCP, it has been proposed to use a composite material, a porous body, or the like in which a resin such as a thermoplastic resin or a thermosetting resin is composited by a method such as dipping for a woven fabric, a nonwoven fabric, a fiber sheet, or the like including LCP fibers (Patent Documents 1 to 7).

Patent Document 1: Japanese Patent Application Laid-Open No. 2009-260228

Patent Document 2: Japanese Patent Application Laid-Open No. 2003-218485

Patent Document 3: Japanese Patent Application Laid-Open No. 2012-224692

Patent Document 4: Japanese Patent Application Laid-Open No. 2006-319324

Patent Document 5: Japanese Patent Application Laid-Open No. 2007-118528

Patent Document 6: Japanese Patent Application Laid-Open No. 2007-169422

Patent Document 7: Japanese Patent Application Laid-Open No. 2006-1959

SUMMARY OF THE INVENTION

However, when a circuit board is produced using a composite material or a porous body formed into a composite by the method as described above, there are problems in that the circuit board can only be formed into a sheet, the circuit board has a weak strength, and the circuit board has large undulations and irregularities, and the like.

Moreover, when these composite materials or porous bodies are laminated to form a multilayered structure, the resins adhere to each other between layers, but the LCP fibers do not adhere to each other, so that a sufficient adhesion strength between the layers cannot be obtained. In particular, in the case of a porous body, when an attempt is made to bond layers to each other by heating and pressurization using a hot pressing machine, the resin forming the porous body softens and the internal pores are crushed, and characteristics as expected cannot be obtained. Therefore, it is necessary to separately use an adhesive for bonding layers to each other.

In view of the above problems, an object of the present disclosure is to provide a molded body having a high strength and an excellent adhesion strength between layers using fine LCP fibers.

A molded body of the present disclosure is a molded body containing: a liquid crystal polymer powder; and optionally containing a resin, in which the liquid crystal polymer powder contains fibrous particles including a liquid crystal polymer, an average diameter of the fibrous particles is 2 μm or less, the optional resin has heat resistance, and the optional resin is a thermoplastic resin or a thermosetting resin.

According to the present disclosure, it is possible to provide a molded body having a high strength and an excellent adhesion strength between layers using fine LCP fibers.

DETAILED DESCRIPTION OF THE INVENTION

Figure 1:
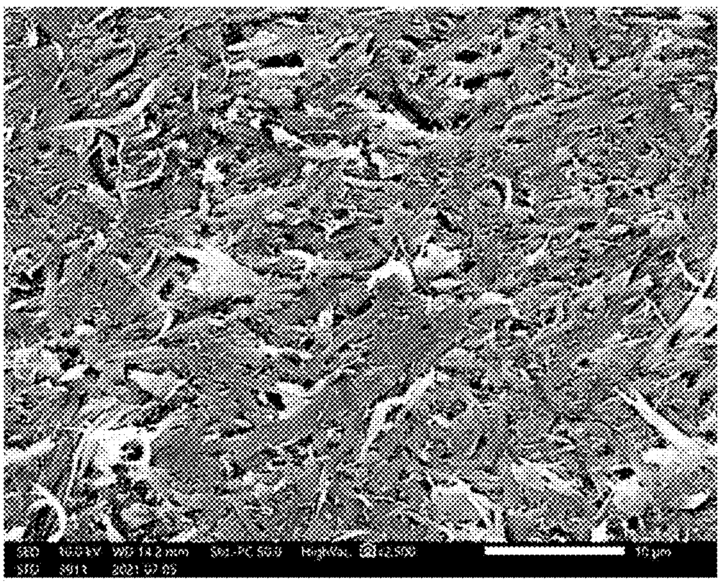
FIG. 1 is an SEM photograph of a surface of a molded body in Example 2.

Hereinafter, the embodiments of the present disclosure will be described, but the present disclosure is not limited thereto.

<Molded Body>

A molded body according to one embodiment of the present disclosure contains a liquid crystal polymer powder (LCP powder), the LCP powder contains fibrous particles including a liquid crystal polymer (liquid crystal polymer fibers: LCP fibers), and an average diameter of the LCP fibers is 2 μm or less. Moreover, the molded body optionally contains a resin, and the resin is a thermoplastic resin or a thermosetting resin.

(Liquid Crystal Polymer Powder)

The liquid crystal polymer is not particularly limited, and examples thereof include a thermotropic liquid crystal polymer. The thermotropic liquid crystal polymer is, for example, an aromatic polyester synthesized mainly containing a monomer such as an aromatic diol, an aromatic dicarboxylic acid, or an aromatic hydroxycarboxylic acid, and exhibits liquid crystallinity during melting.

A molecule of the liquid crystal polymer has a negative linear expansion coefficient (CTE) in an axial direction of a molecular axis and a positive CTE in a radial direction of the molecular axis.

The liquid crystal polymer preferably has no amide bond. Examples of the thermotropic liquid crystal polymer having no amide bond include a copolymer of parahydroxybenzoic acid, terephthalic acid, and dihydroxybiphenyl (a copolymer of parahydroxybenzoic acid and ethylene terephthalate) having a high melting point and a low CTE, which is called a type-1 liquid crystal polymer, and a copolymer of parahydroxybenzoic acid and 2,6-hydroxynaphthoic acid having a melting point between a type-1 liquid crystal polymer and a type-2 liquid crystal polymer, which is called type-1.5 (or type-3).

The LCP fibers contained in the LCP powder are not particularly limited as long as they contain a fibrous portion. The fibrous portion may be linear or may have branching or the like.

An average diameter of the LCP fibers is 2 μm or less and preferably 1 μm or less. Moreover, the average aspect ratio of the LCP fibers is preferably 10 to 500, and more preferably 10 to 300.

Note that, the average diameter and average aspect ratio of the LCP fibers are measured by the following method.

The LCP powder composed of the LCP fibers to be measured is dispersed in ethanol to prepare a slurry in which 0.01 mass % of the LCP powder is dispersed. At this time, the slurry was prepared so that a moisture content in the slurry was 1 mass % or less. Then, 5 μL to 10 μL or less of this slurry was dropped onto a slide glass, and then the slurry on the slide glass was naturally dried. The LCP powder is disposed on the slide glass by naturally drying the slurry.

Next, a predetermined region of the LCP powder disposed on the slide glass is observed with a scanning electron microscope (SEM) to collect 100 or more pieces of image data of the particles (the LCP fibers) constituting the LCP powder. Note that, in the collection of the image data, the region was set according to the size per particle of the LCP so that the number of image data was 100 or more. Moreover, for each particle of the LCP, the image data was collected by appropriately changing a magnification of the SEM to 500 times, 3,000 times, or 10,000 times in order to suppress leakage of the collection of the image data and occurrence of a measurement error.

Next, a longitudinal direction dimension and a width direction dimension of each of the LCP fibers are measured using the collected image data.

In one of the LCP fibers photographed in each piece of the image data, a direction of a straight line connecting both ends of a longest path in a path from one end portion to an end portion opposite to the one end portion through substantially a center of the particle is defined as a longitudinal direction. Then, a length of a straight line connecting both ends of the longest path is measured as the longitudinal direction dimension.

Moreover, a particle dimension of one particle of the LCP powder in a direction orthogonal to the longitudinal direction was measured at three different points in the longitudinal direction. An average value of the dimensions measured at these three points was taken as the width direction dimension (fiber diameter) per particle of the LCP powder.

Furthermore, a ratio of the longitudinal direction dimension to the fiber diameter [longitudinal dimension/fiber diameter] is calculated and taken as the aspect ratio of the LCP fibers.

Then, the average value of the fiber diameters measured for 100 LCP fibers is taken as the average diameter.

Moreover, the average value of the aspect ratios measured for 100 LCP fibers is taken as the average aspect ratio.

Note that, the fibrous particles may be contained in the LCP powder as an aggregate in which the fibrous particles are aggregated.

Moreover, in the fibrous particles, the axial direction of the LCP molecules constituting the fibrous particles and the longitudinal direction of the fibrous particles tend to coincide with each other. Note that, it is considered that this is because, in a case where the LCP powder is produced, the axial direction of the LCP molecules is oriented along the longitudinal direction of the fibrous particles due to breakage between a plurality of domains formed by bundling the LCP molecules.

In the LCP powder, a content (a number ratio) of particles other than the fibrous particles (massive particles that are not substantially fibrous) is preferably 20% or less. For example, when the LCP powder is placed on a plane, particles having a maximum height of 10 μm or less are fibrous particles, and particles having a maximum height of more than 10 μm are massive particles.

The LCP powder preferably has a D50 (an average particle size) value of 13 μm or less as measured by particle size measurement using a particle size distribution measuring device by a laser diffraction scattering method.

(Resin)

The molded body of the present embodiment optionally contains a resin, and preferably contains a resin. The resin has heat resistance and is a thermosetting resin or a thermoplastic resin. The type of the resin may be appropriately selected.

Examples of the thermosetting resin having heat resistance include an epoxy resin, a bismaleimide resin, a phenolic resin, an unsaturated polyester resin, an alkyd resin, and polyurethane. The thermosetting resin having heat resistance is preferably an epoxy resin or a bismaleimide resin.

Examples of the thermoplastic resin having heat resistance include a polyimide resin, polyarylate, a liquid crystal polymer, a polyamideimide resin, a polyetherimide resin, a cycloolefin polymer, a polybenzimidazole resin, and syndiotactic polystyrene. The thermoplastic resin having heat resistance is preferably a solvent-soluble thermoplastic resin, and examples thereof include a solvent-soluble polyimide resin, a solvent-soluble liquid crystal polymer, polyarylate, a polyamideimide resin, a polyetherimide resin, a cycloolefin polymer, a polybenzimidazole resin, and syndiotactic polystyrene.

(Additive)

The molded body of the present embodiment may contain an additive. When the molded body contains an additive, it is possible to impart functions of the additive, such as flame retardancy, thermal conductivity, high dielectric constant, low dielectric constant, and ferromagnetism, to the molded body. Moreover, for example, the strength of the molded body can be increased. Examples of the additive include an inorganic filler, a metal powder, and an organic filler.

(Others)

The molded body of the present embodiment may contain, for example, a curing agent or a curing accelerator within a range not hindering the object of the present disclosure.

Advantageous Effect

The molded body of the present embodiment becomes a molded body having a high strength since the LCP fibers adhere to each other. Moreover, when the molded bodies are laminated, the LCP fibers in different layers adhere to each other between the layers, so that the molded body also has excellent adhesion strength between the layers. Note that, in the molded body of the present embodiment, since the LCP fibers adhere to each other by heating, an adhesive for bonding the LCP fibers to each other is not required.

<Method for Manufacturing Molded Body>

Hereinafter, each step of the method for manufacturing a molded body of the present embodiment will be described.

[Method for Manufacturing Molded Body when Thermosetting Resin is Used as Resin]

Figure 8:
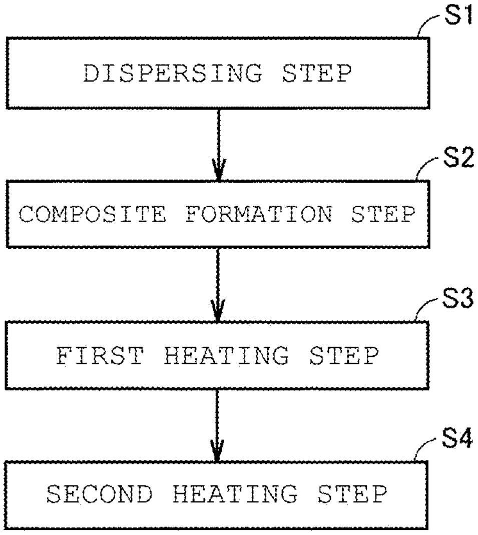
FIG. 8 is an example of a flowchart showing a process for manufacturing a molded body of an embodiment.

As illustrated in FIG. 8, as an example, the method for manufacturing a molded body according to the present embodiment includes a dispersing step (S1), a composite formation step (S2), a first heating step (S3), and a second heating step (S4).

First, a method for producing the LCP powder used in the dispersing step (S1) will be described in detail. The LCP powder can be prepared, for example, by performing the following coarse pulverizing step, fine pulverizing step, coarse particle removing step, and fiberizing step in this order.

Examples of the shape of a LCP-containing raw material (a LCP raw material) used for producing the LCP powder include uniaxially oriented pellets, biaxially oriented films, and powdery LCP. The LCP constituting the LCP raw material is similar to the LCP constituting the LCP fibers described above.

(Coarse Pulverizing Step)

In the coarse pulverizing step, the LCP raw material is coarsely pulverized. For example, the LCP raw material is coarsely pulverized with a cutter mill. A size of the particles of the coarsely pulverized LCP is not particularly limited as long as the particles can be used as a raw material in the fine pulverizing step described later. A maximum particle size of the coarsely pulverized LCP is, for example, 3 mm or less.

Note that, the coarse pulverizing step is not necessarily performed. For example, if the LCP raw material can be used as a raw material in the fine pulverizing step, the LCP raw material may be directly used as a raw material in the fine pulverizing step.

(Fine Pulverizing Step)

In the fine pulverizing step, the LCP raw material (after the coarse pulverizing step) is pulverized in a state of being dispersed in liquid nitrogen to obtain a granular finely pulverized liquid crystal polymer (finely pulverized LCP).

In the fine pulverizing step, it is preferable that the LCP raw material which is dispersed in the liquid nitrogen is pulverized using a medium. The medium is, for example, a bead. In the fine pulverizing step of the present embodiment, it is preferable to use a bead mill having relatively few technical problems from a viewpoint of handling liquid nitrogen. Examples of the apparatus that can be used in the fine pulverizing step include "LNM-08" which is a liquid nitrogen bead mill manufactured by AIMEX CO., LTD.

The granular finely pulverized LCP obtained by the fine pulverizing step preferably has a D50 of 50 μm or less as measured by a particle size distribution measuring device by a laser diffraction scattering method. As a result, this makes it possible to suppress clogging of the granular finely pulverized LCP with a nozzle in the following fiberizing step.

(Coarse Particle Removing Step)

Next, in the coarse particle removing step, coarse particles are removed from the granular finely pulverized LCP obtained in the fine pulverizing step. For example, the granular finely pulverized LCP is sieved with a mesh to obtain the granular finely pulverized LCP under the sieve, and the coarse particles contained in the granular finely pulverized LCP can be removed by removing the granular LCP on the sieve. A type of mesh may be appropriately selected, and examples of the mesh include a mesh having an opening of 53 μm. Note that, the coarse particle removing step is not necessarily performed.

(Fiberizing Step)

Next, in the fiberizing step, the granular LCP is crushed by a wet high-pressure crushing device to obtain LCP powder. In the fiberizing step, first, the finely pulverized LCP is dispersed in a dispersion medium for the fiberizing step. In the finely pulverized LCP to be dispersed, the coarse particles may not be removed, but it is preferable that the coarse particles are removed. Examples of the dispersion medium for the fiberizing step include water, ethanol, methanol, isopropyl alcohol, toluene, benzene, xylene, phenol, acetone, methyl ethyl ketone, diethyl ether, dimethyl ether, hexane, and mixtures thereof.

Then, the finely pulverized LCP in a state of being dispersed in the dispersion medium for the fiberizing step, that is, the paste-like or the slurry-like finely pulverized LCP is passed through the nozzle in a state of being pressurized at high pressure. By passing through the nozzle at a high pressure, a shearing force or collision energy due to a high-speed flow in the nozzle acts on the LCP, and the granular finely pulverized LCP is crushed, so that the fiberization of the LCP proceeds and LCP powder consisting of fine LCP fibers can be obtained. A nozzle diameter of the nozzle is preferably as small as possible within a range in which clogging of the finely pulverized LCP does not occur in the nozzle from a viewpoint of applying high shear force or high collision energy. Since the granular finely pulverized LCP has a relatively small particle size, the nozzle diameter in the wet high-pressure crushing device used in the fiberizing step can be reduced. The nozzle diameter is, for example, 0.2 mm or less.

Note that, as described above, a plurality of fine cracks are formed in the granular finely pulverized LCP. Therefore, the dispersion medium enters into the finely pulverized LCP through fine cracks by pressurization in a wet high-pressure crushing device. Then, when the paste-like or the slurry-like finely pulverized LCP passes through the nozzle and is positioned under normal pressure, the dispersion medium that has entered the finely pulverized LCP expands in a short time. When the dispersion medium that has entered the finely pulverized LCP expands, destruction progresses from inside of the finely pulverized LCP. Therefore, the fiberization proceeds to the inside of the finely pulverized LCP, and the molecules of the LCP are separated into domain units arranged in one direction. As described above, in the fiberizing step according to the present embodiment, by defiberizing the granular finely pulverized LCP obtained in the fine pulverizing step in the present embodiment, it is possible to obtain the LCP powder which has a low content of massive particles and consists of fine LCP fibers as compared with the LCP powder obtained by crushing the granular LCP obtained by a conventional freeze pulverizing method.

Note that, in the fiberizing step in the present embodiment, the finely pulverized LCP may be pulverized by the wet high-pressure crushing device a plurality of times to obtain the LCP powder, but from a viewpoint of production efficiency, the number of times of crushing by the wet high-pressure crushing device is preferably small, and is, for example, 5 times or less.

(Dispersing Step: S1)

In the dispersing step, which is the first step of the method for manufacturing a molded body, the prepared LCP powder is dispersed in a solution obtained by dissolving a resin in a solvent to obtain a liquid mixture. Moreover, some thermosetting resins are in a liquid state before curing, and there is a case where it is not necessary to dissolve a thermosetting resin in a solvent for forming a coating film, but it is preferable to dissolve a thermosetting resin in a solvent since plane orientation of fibers can be performed using a decrease in volume due to drying.

The solvent used in the dispersing step may be any solvent as long as the solvent can dissolve the resin and cannot dissolve the LCP powder, and examples thereof include acetone, N-methyl-2-pyrrolidone (NMP), toluene, methyl ethyl ketone (MEK), N,N-dimethylacetamide (DMAC), ethyl acetate, benzene, and chloroform.

A mixing ratio of the LCP powder and the resin may be, for example, from 1:99 to 75:25 by volume of the LCP powder and the resin.

Moreover, when a molded body containing an additive is manufactured, the additive is added in this step to obtain a mixture of the liquid LCP powder, the resin, and the additive. A mixing ratio of the additive is preferably 50 vol % or less with respect to the mixture.

Note that, when the molded body contains a curing agent or a curing accelerator, mixing is performed in this step. A mixing ratio of the curing agent or the curing accelerator is appropriately adjusted within a range not hindering the object of the present disclosure.

(Composite Formation Step: S2)

Then, in the composite formation step, the liquid mixture is dried to form a composite of the LCP fibers and the resin. In one embodiment of the present invention, the composite formation step includes, for example, an applying step and a drying step. Note that, in the following description, the composite of the LCP fibers and the resin may be simply referred to as "composite".

In the applying step, the liquid mixture is applied to a substrate. Here, the "substrate" refers to a material or a support material for applying a liquid mixture, and examples thereof include a metal foil such as a copper foil, a polyimide film, a PTFE film, and a composite sheet including a reinforcing material such as a glass fiber fabric and a heat-resistant resin which hardly adheres to a resin.

Next, the liquid mixture applied to the substrate is heated and dried in the drying step to vaporize the solvent. By the heating and drying, a composite is formed on the substrate.

Moreover, in the drying step, since the solvent is gradually removed from the liquid mixture, the entire thickness of the liquid mixture gradually decreases during drying. Therefore, the thickness of the composite is reduced compared to the overall thickness of the liquid mixture formed on the product.

Furthermore, as the total thickness of the liquid mixture gradually decreases during drying, a longitudinal direction of the fibrous particles in the LCP powder changes. Specifically, among the fibrous particles, the fibrous particles having the longitudinal direction in the entire thickness direction of the liquid mixture are inclined such that the longitudinal direction is directed toward inside of the main surface of the substrate. Therefore, there is anisotropy in the longitudinal direction of the fibrous particles in the formed composite.

In the composite formation step, the solvent may be vaporized by further applying a liquid mixture onto the composite formed on the substrate in the drying step, and then drying the applied mixture. As described above, the composite formation step may include the applying step and the drying step repeatedly in this order. As a result, a composite having a desired basis weight can be obtained. Moreover, in a case where the applying step and the drying step are repeatedly performed, a mixture in which the mixing ratio of the LCP powder, the resin, and the additive is changed for each applying step may be used. As a result, this makes it possible to obtain a composite capable of forming a molded body having desired properties.

Then, heat treatment may be further performed after the drying step to bring the thermosetting resin into a semi-cured state (so-called B-stage). The conditions (heating temperature and holding time) for bringing the thermosetting resin into the semi-cured state vary depending on the curing characteristics of the thermosetting resin to be used, but it is preferable to perform the heat treatment at a temperature lower than that in the first heating step described below.

(First Heating Step: S3)

Next, the composite is heated in the first heating step to obtain an intermediate.

The heating temperature in the first heating step varies depending on the combination of a thermosetting resin, a curing agent, a catalyst, and the like to be used, but is performed within a range in which crosslinking proceeds sufficiently and abnormal heat generation or the like due to an excessive reaction does not occur. Moreover, the heating temperature in the first heating step is preferably lower than the heating temperature in the second heating step described below.

The holding time in the first heating step may be any time as long as the crosslinking reaction proceeds sufficiently, and may be, for example, 5 minutes or longer or 15 minutes or longer.

Moreover, in the first heating step, pressure may be applied simultaneously with heating. When a laminated molded body is manufactured, pressure is applied simultaneously with heating in the first heating step. The pressure is preferably set to 10 MPa or less. This is because when the pressure exceeds 10 MPa, the LCP resin melts and flows. Moreover, the pressure is preferably set to 1 MPa or more in order to sufficiently bond the LCP fibers to each other between the molded bodies.

Note that, in the case of applying pressure by a pressing machine, a polyimide film, a PTFE film, or a composite sheet including a reinforcing material such as a glass fiber fabric and a heat-resistant resin which hardly adheres to LCP may be interposed as a release film between the pressing machine and the composite.

(Second Heating Step: S4)

Next, the intermediate is heated in the second heating step to obtain a molded body. Moreover, in the second heating step, heating may be performed under an inert gas atmosphere. In this way, the strength of the molded body can be further improved.

The heating temperature in the second heating step is in a range of −60° C. to −5° C. of a melting point of the LCP powder. When the heating temperature is lower than −60° C. of the melting point of the LCP powder, the LCP fibers are weakly bonded to each other, so that a molded body having practical strength cannot be obtained. When the heating temperature is higher than −5° C. of the melting point of the LCP powder, the LCP fibers are softened and deformed, so that a molded body cannot be maintained. The heating temperature is preferably in a range of −50° C. to −10° C. of the melting point of the LCP powder and more preferably in a range of −40° C. to −20° C. of the melting point of the LCP powder.

The holding time in the second heating step is not particularly limited, and may be, for example, 5 minutes or longer or 15 minutes or longer. Moreover, since a molded body having a higher strength is obtained by being held for a long time, for example, the time may be 30 minutes or longer or 60 minutes or longer.

(Other Steps)

If necessary, the substrate bonded to the molded body may be removed by etching or the like. As a result, a molded body to which the substrate is not bonded can be obtained. Moreover, when a copper foil is used as a substrate, a wiring pattern can be obtained by removing a part of the copper foil.

Moreover, when the molded bodies are laminated, plasma treatment may be performed on a surface in contact with another molded body after removal of the substrate. As a result, since the resin covering the LCP fibers on the surface portion of the molded body is removed, the LCP fibers of the molded bodies to be laminated come into contact with each other, and the fusion of the LCP fibers is promoted.

[Method for Manufacturing Molded Body when Thermoplastic Resin is Used as Resin]

Figure 9:
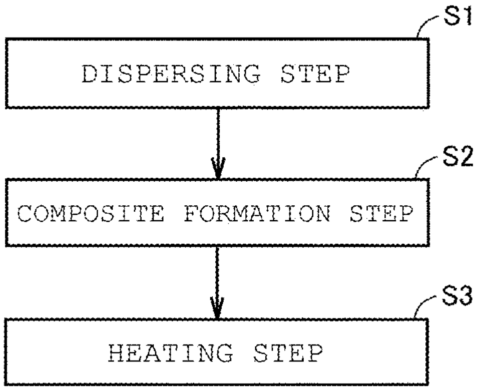
FIG. 9 is another example of the flowchart showing the process for manufacturing a molded body of an embodiment.

As illustrated in FIG. 9, as an example, the method for manufacturing a molded body according to the present embodiment includes a dispersing step (S1), a composite formation step (S2), and a heating step (S3). Note that, the method for producing an LCP powder and other steps are the same as those described above in [Method for manufacturing molded body when thermosetting resin is used as resin], and thus the description thereof will be omitted. Moreover, in the dispersing step (S1) and the composite formation step (S2), the "liquid mixture" described above is replaced with a "paste-like mixture".

(Heating Step: S3)

The composite is heated in the heating step to obtain a molded body. Moreover, in the heating step, heating may be performed under an inert gas atmosphere. In this way, the strength of the molded body can be further improved.

The heating temperature in the heating step is in a range of −60° C. to −5° C. of a melting point of the LCP powder. When the heating temperature is lower than −60° C. of the melting point of the LCP powder, the LCP fibers are weakly bonded to each other, so that a molded body having practical strength cannot be obtained. When the heating temperature is higher than −5° C. of the melting point of the LCP powder, the LCP fibers are softened and deformed, so that a molded body cannot be maintained. The heating temperature is preferably in a range of −50° C. to −10° C. of the melting point of the LCP powder and more preferably in a range of −40° C. to −20° C. of the melting point of the LCP powder.

The holding time in the heating step is not particularly limited, and may be, for example, 5 minutes or longer or 15 minutes or longer. Moreover, since a molded body having a higher strength is obtained by being held for a long time, for example, the time may be 30 minutes or longer or 60 minutes or longer.

Moreover, in the heating step, pressure may be applied simultaneously with heating. When a laminated molded body is manufactured, pressure is applied simultaneously with heating in the heating step. The pressure is preferably set to 10 MPa or less. This is because when the pressure exceeds 10 MPa, the LCP resin melts and flows. Moreover, the pressure is preferably set to 1 MPa or more in order to sufficiently bond the LCP fibers to each other between the molded bodies.

Note that, in the case of applying pressure by a pressing machine, a polyimide film, a PTFE film, or a composite sheet including a reinforcing material such as a glass fiber fabric and a heat-resistant resin which hardly adheres to LCP may be interposed as a release film between the pressing machine and the composite.

(Resin Removing Step: S5)

When a solvent-soluble thermoplastic resin is used as a resin, at least a part of the solvent-soluble thermoplastic resin may be removed from the molded body. As a result, a molded body in which the removed resin portion is made porous can be obtained.

For the removal of the resin, for example, the solvent-soluble thermoplastic resin may be removed by treating the molded body with a solvent after heating. The heating temperature is preferably in a range in which the solvent to be used is not rapidly vaporized. The solvent preferably dissolves only the thermoplastic resin without dissolving the LCP powder.

EXAMPLES

Hereinafter, the present disclosure will be described in more detail with reference to the examples, but the present disclosure is not limited thereto.

<<Test 1>>

Example 1

(Producing Liquid Crystal Polymer Powder)

In Example 1, first, uniaxially oriented pellets of LCP (cylindrical pellet having a diameter of 3 to 4 mm, melting point: 315° C.) were prepared as the LCP raw material. The material of LCP is a copolymer of parahydroxybenzoic acid and 4,6-hydroxynaphthoic acid.

This LCP raw material was coarsely pulverized by a cutter mill (MF10, manufactured by IKA). The coarsely pulverized LCP was passed through a mesh having a diameter of 3 mm provided at a discharge port of the cutter mill to obtain a coarsely pulverized LCP.

Next, the coarsely pulverized LCP was finely pulverized with a liquid nitrogen bead mill (LNM-08 manufactured by AIMEX CORPORATION, vessel capacity: 0.8 L). Specifically, 500 mL of media and 30 g of coarsely pulverized LCP were put into a vessel, and pulverization treatment was performed at a rotation speed of 2000 rpm for 120 minutes. As the medium, beads made of zirconia ($ZrO_2$) having a diameter of 5 mm were used. Note that, in the liquid nitrogen bead mill, wet pulverizing treatment is performed in a state in which the coarsely pulverized LCP is dispersed in the liquid nitrogen. As described above, by pulverizing the coarsely pulverized LCP with the liquid nitrogen bead mill, granular finely pulverized LCP was obtained.

The particle size of the finely pulverized LCP was measured. The finely pulverized LCP dispersed in the dispersion medium was subjected to ultrasonic treatment for 10 seconds, and then set in a particle size distribution measuring device (LA-950 manufactured by HORIBA Ltd.) by a laser diffraction scattering method to measure the particle size. Note that, as the dispersion medium, Ekinen (registered trademark, Japan Alcohol Sales Co., Ltd.) which was a mixed solvent containing ethanol as a main agent was used. A measured value of D50 for the finely pulverized LCP was 23 μm.

Next, a dispersion liquid obtained by dispersing the finely pulverized LCP in Ekinen was sieved with a mesh having an opening of 53 μm to remove the coarse particles contained in the finely pulverized LCP, and finely pulverized LCP passing through the mesh was recovered. A yield of the finely pulverized LCP by the removal of coarse particles was 85 mass %.

Next, the finely pulverized LCP from which the coarse particles were removed was dispersed in a 20 mass % ethanol aqueous solution. An ethanol slurry in which the finely pulverized LCP was dispersed was repeatedly crushed five times using a wet high-pressure crushing device under conditions with a nozzle diameter of 0.2 mm and a pressure of 200 MPa to be formed into fibers. As the wet high-pressure crushing device, a high-pressure crushing device (Nanoveta manufactured by Yoshida Kikai Kogyo Co., Ltd.) was used. The ethanol slurry in which the finely pulverized LCP was dispersed was dried with a spray dryer to obtain the LCP powder. An average fiber diameter measured for 100 LCP fibers contained in the LCP powder was 0.8 μm.

(Manufacturing of Molded Body)

A bisphenol A-type epoxy resin (jER828 manufactured by Mitsubishi Chemical Corporation) as a resin (thermosetting resin) and an imidazole-based curing agent (EMI24 manufactured by Mitsubishi Chemical Corporation) as a curing agent were prepared.

The resin and the curing agent were dissolved in acetone as a solvent to obtain a first mixed solution. The mixing ratio of the resin, the curing agent, and the solvent was 10:0.2:89.8 in terms of the mass ratio. The LCP powder obtained above was mixed with the first mixed solution to obtain a second mixed solution. The mixing ratio of the resin and the LCP powder in the second mixed solution was 9:1 in terms of the volume ratio.

Next, the second mixed solution was applied onto a surface of a non-roughened electrolytic copper foil (F0-WS-12 manufactured by Furukawa Electric Co., Ltd.) having a thickness of 12 μm using a metal plate having a thickness of 0.1 mm. Then, the electrolytic copper foil coated with the second mixed solution was heated in a hot air oven at 150° C. for 60 minutes to vaporize acetone as a solvent, and the second mixed solution on the electrolytic copper foil was dried and then the resin was cured to obtain a cured body. The copper foil integrated with the cured body was removed all using ferric chloride to obtain a composite (first composite) of the LCP fibers as a core and the cured thermosetting resin.

Next, the second mixed solution was applied onto a roughened surface of an electrolytic copper foil (FWJ-WS-12 manufactured by Furukawa Electric Co., Ltd.) having a thickness of 12 μm using the same metal plate. Then, the electrolytic copper foil coated with the second mixed solution was heated in a hot air oven at 120° C. for 5 minutes to vaporize acetone as a solvent, and the second mixed solution on the electrolytic copper foil was dried and then the resin was semi-cured. As a result, on the electrolytic copper foil, a composite (second composite) of the thin LCP fibers and the resin semi-cured to be solid at normal temperature was formed.

Then, the surface of the first composite from which the electrolytic copper foil had been removed and the surface of the second composite on a side opposite to the electrolytic copper foil were subjected to plasma treatment using a plasma treatment apparatus (SAMCO INC., Plasma Cleaner PC-300). The plasma treatment was performed for 5 minutes using argon as a treatment gas under the conditions of a flow rate of 10 sccm and an output of 250 W.

Then, the first composite and the second composite subjected to the plasma treatment were heat-pressed using a high temperature vacuum press machine (KVHC manufactured by Kitagawa Seiki Co., Ltd.). Specifically, first, the first composite and the second composite were disposed so that the plasma-treated surfaces were in contact with each other, and a release film was further laminated on a side of the first composite opposite to the second composite, thereby obtaining a laminate. As the release film, a polyimide film (Kapton (registered trademark) 100H manufactured by DU PONT-TORAY CO., LTD., thickness: 25 μm) was used. Then, the laminate was set in the high temperature vacuum press machine, and pressed together with the electrolytic copper foil at a temperature of 150° C. and a press pressure of 2 Mpa for 20 minutes. After completion of the heat-pressing, the release film was removed to obtain an intermediate formed on the electrolytic copper foil.

The intermediate was left to stand still in a stainless steel tray, and heated in a hot air inert oven (Inert gas oven INH-21CD manufactured by Thermo Systems Co., Ltd.). Specifically, heat treatment was performed at 270° C. for 15 minutes under a nitrogen stream. As a result, a molded body of Example 1 was obtained.

Example 2

In Example 2, a solvent-soluble polyimide resin (PI R&D CO., LTD. Q-AD-X0516, solid concentration: 10 mass %) was used as the resin (thermoplastic resin).

The resin and the same LCP powder as in Example 1 were dissolved in NMP as a solvent to obtain a paste-like mixture having a solid content of 8 vol %. The mixing ratio of the resin and the LCP powder in the mixture was 9:1 in terms of the volume ratio.

Next, the paste-like mixture was applied onto a surface of the same non-roughened electrolytic copper foil as the first composite of Example 1 using a metal plate having a thickness of 0.4 mm. Then, the electrolytic copper foil coated with the paste-like mixture was heated in a hot air oven at 150° C. for 15 minutes to vaporize NMP as a solvent, and the paste-like mixture on the electrolytic copper foil was dried. In this way, a composite was formed on the electrolytic copper foil.

Two composites described above were prepared, and the electrolytic copper foil was removed by the same method as in Example 1. Then, the surface of one composite from which the electrolytic copper foil had been removed and the surface of the other composite on a side opposite to the surface from which the electrolytic copper foil had been removed were subjected to plasma treatment under the same conditions using the same plasma treatment apparatus as in Example 1.

Each composite subjected to the plasma treatment was heat-pressed using the same high temperature vacuum press machine as in Example 1. Specifically, first, each composite was laminated so that the plasma-treated surfaces were in contact with each other, and a release film was laminated on a side opposite to the plasma-treated surface of each composite, that is, the surface of the laminated composite in contact with the press plate of the high temperature vacuum press machine, thereby obtaining a laminate. As a release film, a PTFE skived film (thickness: 50 μm) was used. Then, the laminate was set in the high temperature vacuum press machine, and pressed at a temperature of 280° C. and a press pressure of 6 Mpa for 20 minutes. After completion of the heat-pressing, the release film was removed. As a result, a molded body of Example 2 was obtained.

Comparative Example 1

In Comparative Example 1, heating by a hot air inert oven was not performed in Example 1. That is, the intermediate of Example 1 corresponds to the molded body of Comparative Example 1.

Comparative Example 2

In Comparative Example 2, a molded body of Comparative Example 2 was obtained in the same manner as in Example 2, except that the temperature of the high temperature vacuum press machine was set to 250° C. in Example 2.

Comparative Example 3

In Comparative Example 3, a commercially available melt-blown non-woven fabric was impregnated into the first mixed solution used in Example 1. A molded body of Comparative Example 3 was obtained in the same manner as in Example 1 except for the above-mentioned difference.

Comparative Example 4

In Comparative Example 4, the same resin as in Example 2 and the melt-blown non-woven fabric as in Comparative Example 3 were impregnated with NMP. A molded body of Comparative Example 4 was obtained in the same manner as in Example 2 except for the above-mentioned difference.

[Observation of Molded Body]

The molded bodies in Examples 1 and 2 and Comparative Examples 1 to 4 were immersed in NMP for 3 minutes. As a result, in the molded bodies of Examples 1 and 2, peeling of the laminated surface of the molded body was not confirmed although the resin was swollen. Moreover, when the section of the molded body was observed with SEM, it could be confirmed that the LCP fibers were fused to each other including laminated surface.

On the other hand, in the molded bodies of Comparative Examples 1 to 4, it was confirmed that the resin was swollen and the laminated surface of the molded body was also peeled off. Moreover, when the section of the molded body was observed with SEM, it could be confirmed that the fusion between the LCP fibers was insufficient or the LCP fibers were not fused to each other including laminated surface.

Figure 2:
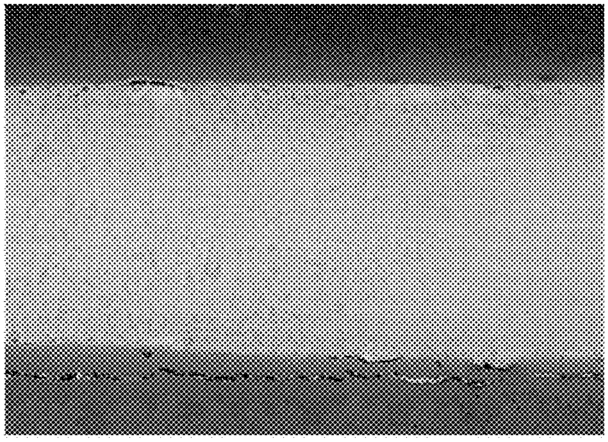
FIG. 2 is an optical photomicrograph of a section of the molded body in Example 2.

Note that, FIG. 1 is an SEM photograph of a surface of a molded body in Example 2. From FIG. 1, it could be confirmed that the surface of the molded body had small undulations and irregularities. FIG. 2 is an SEM photograph of a section of the molded body in Example 2 before being treated with NMP. From FIG. 2, it could be confirmed that the molded body was bonded.

<<Test 2>>

Example 3

The molded body of Example 2 was prepared. The molded body was immersed in NMP filled in a tray, and heated on a hot plate at 130° C. for 5 minutes to remove the resin all, thereby obtaining a molded body of Example 3.

Comparative Example 5

The molded body of Comparative Example 2 was prepared. By performing the same treatment as in Example 3, the resin was removed all to obtain a laminate of Comparative Example 5.

[Observation of Molded Body]

Figure 4:
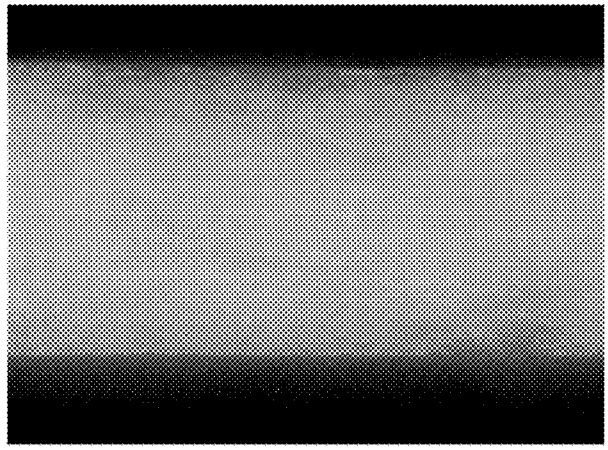
FIG. 4 is an optical photomicrograph of a section of the molded body in Example 3.
Figure 5:
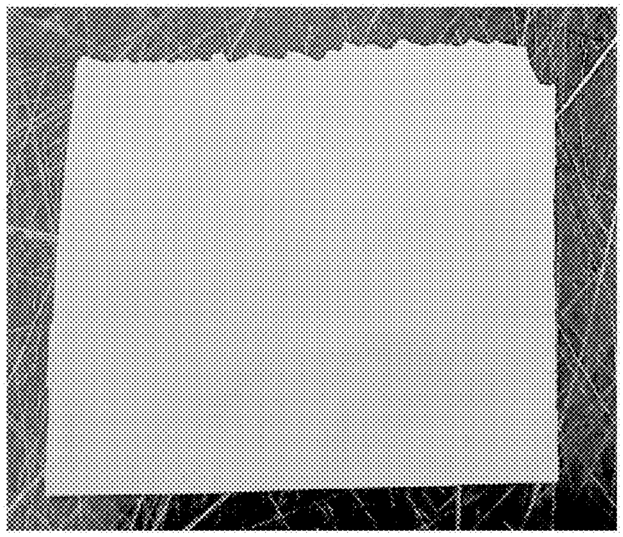
FIG. 5 is a photograph of the molded body in Example 3 taken in the form of a film.
Figure 6:
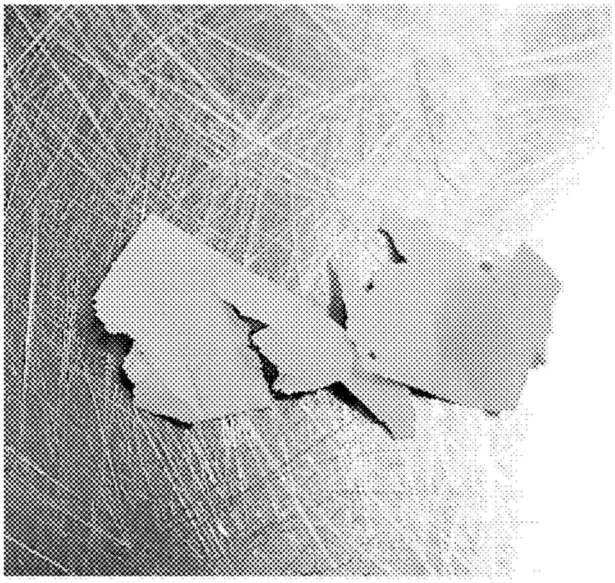
FIG. 6 is a photograph of a molded body in Comparative Example 5 taken in the form of a film.

In Example 3, when the resin was removed all, peeling of the laminated surface of the molded body was not confirmed, and the molded body was not disintegrated (see FIGS. 4 and 5). In Comparative Example 5, by removing the resin all, the laminated surface of the molded body was not only peeled off, but also disintegrated into fragments (see FIG. 6).

Figure 3:
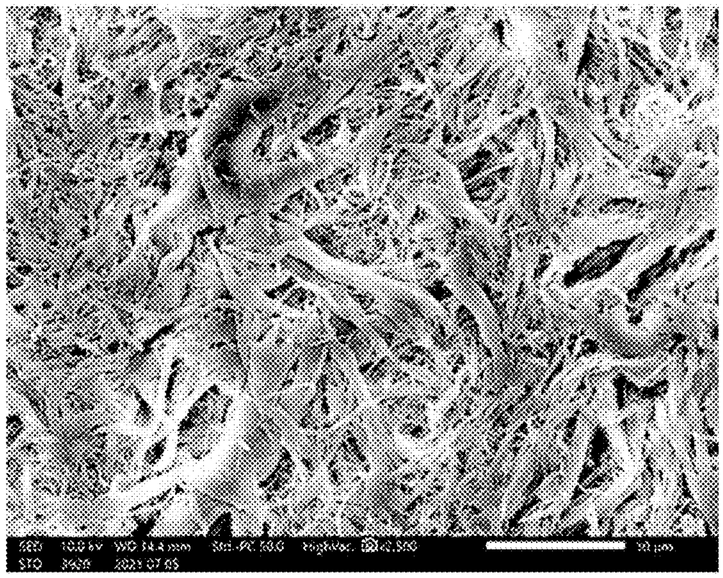
FIG. 3 is an SEM photograph of a surface of a molded body in Example 3.

Note that, FIG. 3 is an SEM photograph of a surface of a laminate in Example 3. From FIG. 3, it could be confirmed that the LCP fibers were closely bonded to each other, but spaces existed between the LCP fibers to form a porous body.

Moreover, the dielectric constant of the molded body of Example 3 was measured in accordance with JIS R 1641 and IEC 63185. As a result, the effective relative dielectric constant in the 30 GHz band was 2.0, and the dielectric loss tangent was 0.0006. This is an intermediate value between the LCP fiber and air because the effective relative dielectric constant and the dielectric loss tangent of the LCP fiber used as a raw material are 3.0 and 0.001, respectively, and the effective relative dielectric constant and the dielectric loss tangent of air are 1.0 and 0, respectively. Thus, it can be seen that the electrical characteristics are greatly improved.

<<Test 3>>

Example 4

Four composites of Example 2 were prepared. A wiring pattern was formed on the copper foil of the composite by a subtractive method and filled with a conductive paste. After the filling, using the same high temperature vacuum press machine as in Example 1, pressing was performed at a temperature of 280° C. and a press pressure of 4 Mpa for 20 minutes to prepare a four-layer flexible printed-circuit (FPC) board.

The FPC board was immersed in NMP filled in a tray, and heated on a hot plate at 130° C. for 60 minutes to remove the resin all, thereby obtaining an FPC board of Example 4.

[Observation of FPC Board]

Figure 7:
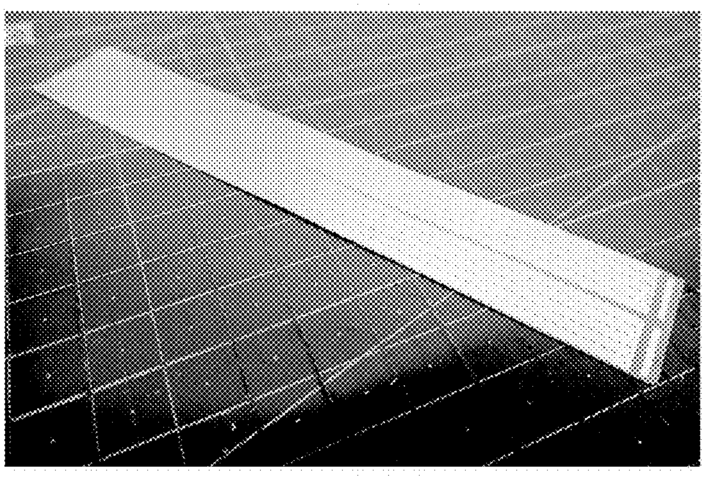
FIG. 7 is a photograph of a flexible printed-circuit board in Example 4.

In Example 4, when the resin was removed all, peeling of the laminated surface of the FPC board was not confirmed, and it was confirmed that there was no peeling of the electrode (see FIG. 7).

<<Test 4>>

Example 5

In Example 5, a PTFE powder (average particle size: 4 μm) was prepared as an additive.

The PTFE powder, the same resin as in Example 2, and the same LCP powder as in Example 1 were dissolved in NMP as a solvent to obtain a paste-like mixture having a solid content of 8 vol %. The mixing ratio of the PTFE powder, the resin, and the LCP powder in the mixture was 2:2:1 in terms of the volume ratio. A molded body of Example 5 was obtained in the same manner as in Example 2 except for the above-mentioned difference.

[Measurement of Water Content Ratio]

The water content ratio of each molded body of Example 5 and Example 2 described above was measured. Specifically, each molded body was immersed in water at 20° C. for 24 hours, moisture on the surface of each molded body was wiped off, and then the water content ratio of each molded body was immediately measured using the Karl Fischer's method. Note that, the number n of each molded body is 3, and the value to be described later is an average value thereof.

As a result, the water content ratio of Example 2 was 1.8 mass %, and the water content ratio of Example 5 was 0.8 mass %. From this, it was confirmed that the water content ratio of the molded body can be reduced by adding PTFE as an additive.

In the description of the above embodiment, combinable configurations may be combined with each other.

The embodiments and examples disclosed herein are all to be considered by way of examples in all respects, but not limiting. The scope of the present invention is specified by the claims, but not the above description, and intended to encompass all modifications within the spirit and scope equivalent to the claims.

The invention claimed is:

1. A method for manufacturing a molded body, the method comprising:

dispersing a liquid crystal polymer powder in a solution obtained by dissolving a thermosetting resin in a solvent to obtain a liquid mixture, wherein the liquid crystal polymer powder contains fibrous particles including a liquid crystal polymer, and an average diameter of the fibrous particles is 2 μm or less;

drying the liquid mixture to form a composite;

heating the composite to obtain an intermediate; and further heating the intermediate in a range of −60° C. to −5° C. of a melting point of the liquid crystal polymer powder to obtain a molded body, wherein the thermoplastic resin is a solvent-soluble thermoplastic resin, and the manufacturing method further comprises removing at least a part of the solvent-soluble thermoplastic resin from the molded body.

2. The method for manufacturing the molded body according to claim 1, further comprising dispersing an additive in the solution.

3. A method for manufacturing a molded body, the method comprising:

dispersing a liquid crystal polymer powder in a solution obtained by dissolving a thermoplastic resin in a solvent to obtain a paste-like mixture, wherein the liquid crystal polymer powder contains fibrous particles including a liquid crystal polymer, and an average diameter of the fibrous particles is 2 μm or less;

drying the paste-like mixture to form a composite; and heating the composite in a range of −60° C. to −5° C. of a melting point of the liquid crystal polymer powder to obtain a molded body, wherein the thermoplastic resin is a solvent-soluble thermoplastic resin, and the manufacturing method further comprises removing at least a part of the solvent-soluble thermoplastic resin from the molded body.

4. The method for manufacturing the molded body according to claim 3, further comprising dispersing an additive in the solution.

* * * * *